(12) United States Patent  
Yip et al.

(10) Patent No.: US 9,396,043 B2  
(45) Date of Patent: Jul. 19, 2016

(54) SYNCHRONIZATION ACROSS APPLICATIONS

(71) Applicant: Microsoft Corporation, Redmond, WA (US)

(72) Inventors: Clement Chun Pong Yip, Hong Kong (CN); Nathan A Helgren, Redmond, WA (US); Rong Zhou, Shanghai (CN); Ting Liu, Shanghai (CN); Bin Yang, Shanghai (CN); ZhenXiong Ma, Shanghai (CN); Chung Yiu Daniel Chow, Hong Kong (CN); Janardhanan Vidhu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 13/859,734

(22) Filed: Apr. 10, 2013

(65) Prior Publication Data

US 2014/0310327 A1 Oct. 16, 2014

(51) Int. Cl.
*G06F 9/22* (2006.01)
*G06F 9/52* (2006.01)

(52) U.S. Cl.
CPC ............ *G06F 9/52* (2013.01); *G06F 2209/522* (2013.01)

(58) Field of Classification Search
CPC ....... G06F 9/45541; G06F 3/048; G06F 8/65; G06F 9/52–9/528; G07C 9/00103; G07C 9/00182; H04L 41/12; H04L 41/145
USPC .................. 709/201, 229; 340/5.61; 345/419; 715/736, 741
See application file for complete search history.

(56) References Cited

U.S. PATENT DOCUMENTS

| | | | |
|---|---|---|---|
| 7,401,334 B2 | 7/2008 | Fussell | |
| 8,719,432 B1* | 5/2014 | Vermeulen et al. | 709/229 |
| 8,948,790 B1* | 2/2015 | Kim | H04W 4/046 455/41.1 |
| 2004/0049345 A1 | 3/2004 | McDonough et al. | |
| 2004/0117414 A1* | 6/2004 | Braun et al. | 707/204 |
| 2006/0170533 A1* | 8/2006 | Chioiu et al. | 340/5.61 |
| 2006/0202799 A1* | 9/2006 | Zambo et al. | 340/5.72 |
| 2008/0114830 A1 | 5/2008 | Welingkar et al. | |
| 2009/0064744 A1* | 3/2009 | Wang | 70/278.1 |
| 2009/0094242 A1 | 4/2009 | Lo et al. | |
| 2011/0029882 A1* | 2/2011 | Jaisinghani | 715/736 |
| 2011/0134111 A1* | 6/2011 | Stone | 345/419 |
| 2014/0164941 A1* | 6/2014 | Kim et al. | 715/741 |

(Continued)

OTHER PUBLICATIONS

"The Chubby lock service for loosely-coupled distributed systems" by Mike Burrows, Google Inc. In 2006.*

(Continued)

*Primary Examiner* — Wing F Chan
*Assistant Examiner* — Raji Krishnan
(74) *Attorney, Agent, or Firm* — Aneesh Mehta; Katherine Drakos; Micky Minhas

(57) ABSTRACT

Mechanisms of synchronization between different types of application, using communication between client and server devices, are described. As an example, synchronization between a script running in a browser and a native application may be implemented using a lock service on a server. Mechanisms for synchronization also allow for applications on different client devices to be automatically synchronized. Identifiers may be automatically used by a synchronization mechanism implemented by a service. Identifiers may include user, machine, application or other identifiers. Messages and protocols between the client devices and server services to create, use, and destroy a lock are described.

20 Claims, 11 Drawing Sheets

(56) References Cited

U.S. PATENT DOCUMENTS

2014/0375422 A1* 12/2014 Huber et al. ............... 340/5.61
2015/0007167 A1* 1/2015 Mody et al. ................ 717/176

OTHER PUBLICATIONS

Hill, David et al, Chapter 4—Occasionally Connected Smart Clients, Smart Client Architecture and Design Guide, Jun. 2004, 18 pages, Microsoft, Redmond, USA; http://msdn.microsoft.com/en-us/library/ff650163.aspx.

Sipos, Gergely, et al, Workflow-Oriented Collaborative Grid Portals, Proceedings of European Grid Conference, Feb. 2005, 10 Pages, Springer, Amsterdam; http://citeseerx.ist.psu.edu/viewdoc/download?doi=10.1.1.103.2575&rep=rep1&type=pdf.

Chappell, David, The Workflow Way Understanding Windows Workflow Foundation, Apr. 2009 http://msdn.microsoft.com/en-us/library/dd851337.aspx.

* cited by examiner

SYNCHRONIZATION ACROSS APPLICATIONS

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments herein relate to synchronization of applications. Computer-related methods and systems described herein may be used to synchronize activity, such as blocking one application from further processing, while allowing another application to process. Embodiments herein may also be used for other computer related purposes, such as for allowing one application to process updates or modifications to an operating system, while another process waits for those changes, or allowing one application to wait for another application on another device to finish processing of a task.

Synchronization has focused on synchronizing processing threads within an application or process. A problem with existing synchronization methods may be that they do not offer a convenient way to synchronize a web application with an activity of a native application. Similarly, existing synchronization mechanisms, such as mutexes, semaphores, critical sections and other multi-threading lock mechanisms, may not solve a problem of synchronizing applications across devices.

A technical advantage of synchronization across different types of application is that each type of application may be very different, and have advantages associated with that type of application, and yet synchronization may be performed so that those applications inter-operate, even if direct communication mechanisms between the applications are not possible. By way of example, a first application may be desirable as a web application because it may comprise real-time updates on a server. In contrast, a second application may be preferable as a native application because it may update an operating system. The web application may need to synchronize with the native application, and under that circumstance, a synchronization mechanism may be advantageous.

Another technical advantage of synchronization between different types of applications is that it indirectly solves communication between those applications. For example, where an application on one machine is not able to easily communicate with another application on another machine, or even another application on the same machine, a synchronization process, using an intermediate lock service, is able to transfer information about the progress of one application with tasks or whether the other application is busy. In particular, this technique may be useful when security permissions may restrict the ability of one application to communicate with another. For example, it may be difficult for a web client application, operating within a security sandbox, to communicate directly with a native application running on an operating system, and so an embodiment locking mechanism may provide a framework for coordination of tasks.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of present examples and is not intended to represent the only forms in which the present examples may be constructed or utilized. The description sets forth functions of the examples and sequence of steps for constructing and operating the examples. However, the same or equivalent functions and sequences may be accomplished by different examples.

Figure 1:
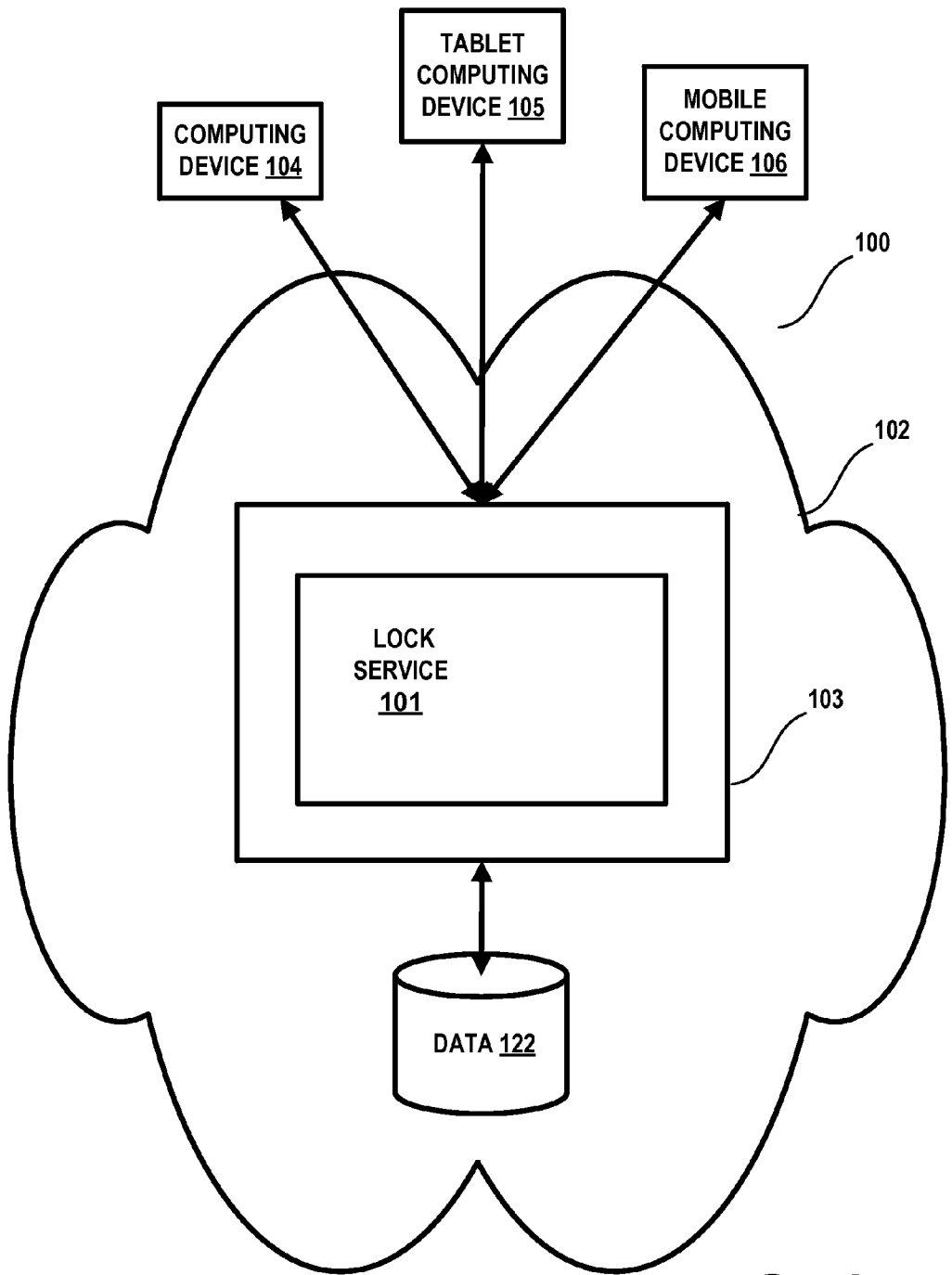
FIG. 1 is a block diagram of an example operating environment for implementing embodiments of the invention.

FIG. 1 shows an embodiment of an operating environment 100 for implementing embodiments of the invention. FIG. 1 and the following discussion are intended to provide a brief, general description of a suitable computing environment to implement embodiments of the invention. The operating environment 100 is only one example of a suitable operating environment. FIG. 1 illustrates a lock server service implemented on one or more servers, but it is to be appreciated that the lock service may also just execute on one or more client computing systems, or still further, it may execute on a combination of client and server computing systems.

Referring to FIG. 1, operating environment 100 includes a network 102. Network 102 may be the internet, or network 102 may comprise an intranet, and the like. A lock service 101 may communicate with computing devices 104, 105, and 106 over network 102. An example computing device is described below in connection with FIG. 2. Computing device 104 may include any type of personal computer, such as a desktop computer, mainframe computer, and the like. Computing device 104 may run operating systems such as MICROSOFT WINDOWS, GOOGLE CHROME, APPLE IOS, or any other computer operating system. Tablet computing device 105 includes slate or tablet devices that may be personally carried and used for browsing online services. Examples of a tablet computing device 105 may include a MICROSOFT SURFACE, APPLE IPAD, SAMSUNG GALAXY computers, or any other tablet computing device 105 that may be capable of being personally carried. Mobile computing device 106 may include smart phones, or other mobile computers. Mobile computing device 106 may be similar to a tablet computing device 105, or may have a smaller screen. Examples of mobile computing devices are smart phones running MICROSOFT WINDOWS PHONE operating system, APPLE IPHONES, or mobile phones running GOOGLE ANDROID, or any other phone running any other operating system. Each computing device 104-106 may be used to either access the lock service described herein.

Still referring to FIG. 1, operating environment 100 includes an exemplary server or servers 103 configured to provide lock service 101. Lock service 101 may send binary data, text data, XML data, Hypertext Markup Language (HTML), Simple Object Access Protocol (SOAP), or other messages or web service calls in any protocol to the client devices 104-106 via network 102. Lock service 101 may be configured to communicate with a data source 122. Data source 122 may store the data related to the state of the locks held for applications running on client devices 104-106, and data source 122 may also hold associated data with the locks, such as one or more identifiers associated with a lock.

Figure 2:
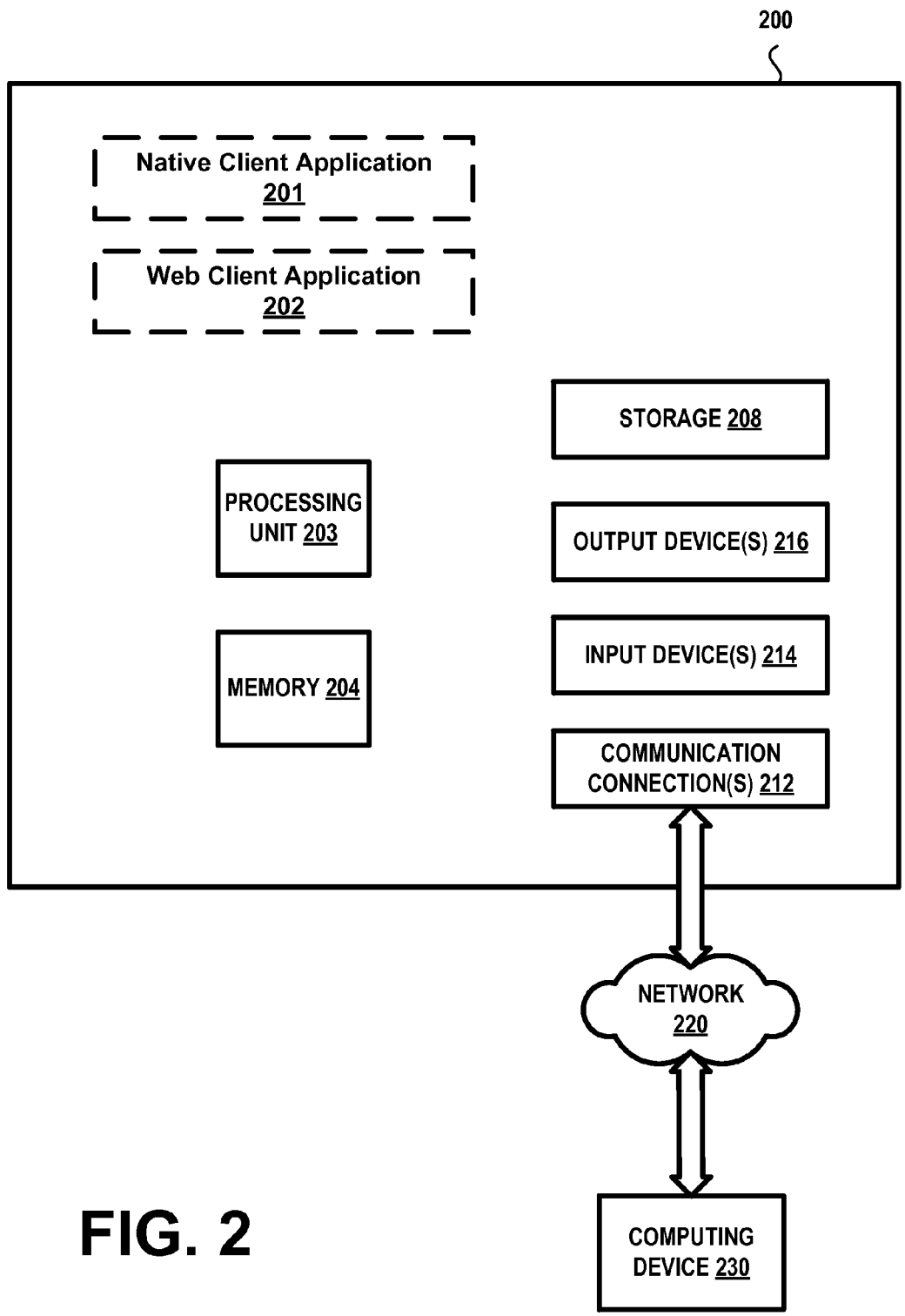
FIG. 2 is a block diagram of an example computing device for implementing embodiments of the invention.

FIG. 2 shows an embodiment of a local client computing device 200 for using one or more embodiments of the invention. FIG. 2 illustrates a computing device 200 that may display or use lock information on the computing device 200 itself or send or receive data representations related to one or more locks. Computing device 200 may be a personal computer, a mobile device computer, a tablet device computer, a system on a chip or any other computing device. In one embodiment, computing device 200 may be used as a client system that receives lock information from a remote system. In its most basic configuration, computing device 200 typically includes at least one processing unit 203 and memory 204. Depending on the exact configuration and type of computing device, memory 204 may be volatile (such as RAM), non-volatile (such as ROM, flash memory, etc.) or some combination of the two. Computing device 200 may run one or more applications. In FIG. 2, an exemplary native client application 201 and web client application 202 are shown. The one or more client applications may be a web application running in a browser, a native application run on an operating system, a component of an operating system, a driver, or any other piece of software and/or hardware on the client device 200. Applications 201 and 202 may store data and instructions in memory 204 and use processing unit 203 to execute computer instructions.

Additionally, computing device 200 may also have additional hardware features and/or functionality. For example, still referring to FIG. 2, computing device 200 may also include hardware such as additional storage (e.g., removable and/or non-removable) including, but not limited to, magnetic or optical disks or tape. Storage 208 is illustrated in FIG. 2 by storage 208. In one embodiment, computer readable instructions to implement embodiments of the invention may be stored in storage 208. Storage 208 may also store other computer readable instructions to implement an operating system, an application program (such as an applications that run on the device 200), and the like.

Embodiments of the invention will be described in the general context of "computer readable instructions" being executed by one or more computing devices. Software may include computer readable instructions. Computer readable instructions may be distributed via computer readable media (discussed below). Computer readable instructions may be implemented as program modules, such as functions, objects, methods, properties, application programming interfaces (APIs), data structures, and the like, that perform particular tasks or implement particular data types. Typically, the functionality of the computer readable instructions may be combined or distributed as desired in various environments.

The term "computer readable media" as used herein includes computer storage media. "Computer readable storage media" includes volatile and nonvolatile, removable and non-removable media implemented in any method or technology for storage of information such as computer readable instructions, data structures, program modules, or other data. Computer readable storage media may be non-transient. Memory 204 and storage 208 are examples of computer storage media. Computer readable storage media includes, but is not limited to, RAM, ROM, EEPROM, flash memory or other memory technology, CD-ROM, digital versatile disks (DVDs) or other optical storage, magnetic cassettes, magnetic tape, magnetic disk storage, or other magnetic storage devices, solid-state drives, or NAND-based flash memory. "Computer readable storage media" does not consist of "modulated data signal." Any such computer storage media may be part of device 200.

The term "computer readable media" may include communication media. Device 200 may also include communication connection(s) 212 that allows the device 200 to communicate with other devices, such as with other computing devices through network 220. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Computing device 200 may also have input device(s) 214 such as keyboard, mouse, pen, voice input device, touch input device, gesture detection device, laser range finder, infra-red cameras, video input devices, and/or any other input device. Input device(s) 214 may include input received from gestures or by touching a screen. For example, input device(s) 214 may detect swiping the screen with a finger, or one or more gestures performed in front of sensors (e.g., MICROSOFT KINECT). Output device(s) 216 includes items such as, for example, one or more displays, projectors, speakers, and printers.

Those skilled in the art will realize that computer readable instructions may be stored on storage devices that are distributed across a network. For example, a computing device 230 accessible via network 220 may store computer readable instructions to implement one or more embodiments of the invention. Computing device 200 may access computing device 230 and download a part or all of the computer readable instructions for execution. Communication connection 212 and network 220 may be used to facilitate communication between computing device 200 and computing device 230. Network 220 may include the internet, intranet, or any other network. Alternatively, computing device 200 may download pieces of the computer readable instructions, as needed, or some instructions may be executed at computing device 200 and some at computing device 230. Display representations may be sent from computing device 200 to computing device 230 or vice versa. Those skilled in the art will also realize that all or a portion of the computer readable instructions may be carried out by a dedicated circuit, such as a Digital Signal Processor (DSP), programmable logic array, and the like.

Example Lock Service Architecture

Embodiments of the invention provide a mechanism for locking different applications across different types of application. Optionally, the locks may be per user, per machine, or per application. A lock service allows different application types to block or wait for each other in a synchronized manner, even when one application is a web application and another is a native application and even if the applications are not able to communicate directly. A lock may also be used when a resource (including, for example, an input/output device such as printer, connected home appliance such as a loud speaker, refrigerator, freezer, etc.) needs to be shared among multiple applications which attempt to accomplish tasks that may not be completely dependent on one another. This may be used, for example, when an application desires to track the number of other applications, users, machines or devices that are accessing the resource. A single lock may maintain states for more than one entity/resource, just as libraries may keep multiple copies of a book. That means more than one, yet a limited number of, applications may be allowed to "hold the lock" and do work with the associated resources, while one or more other applications wait for the resource.

Figure 3:
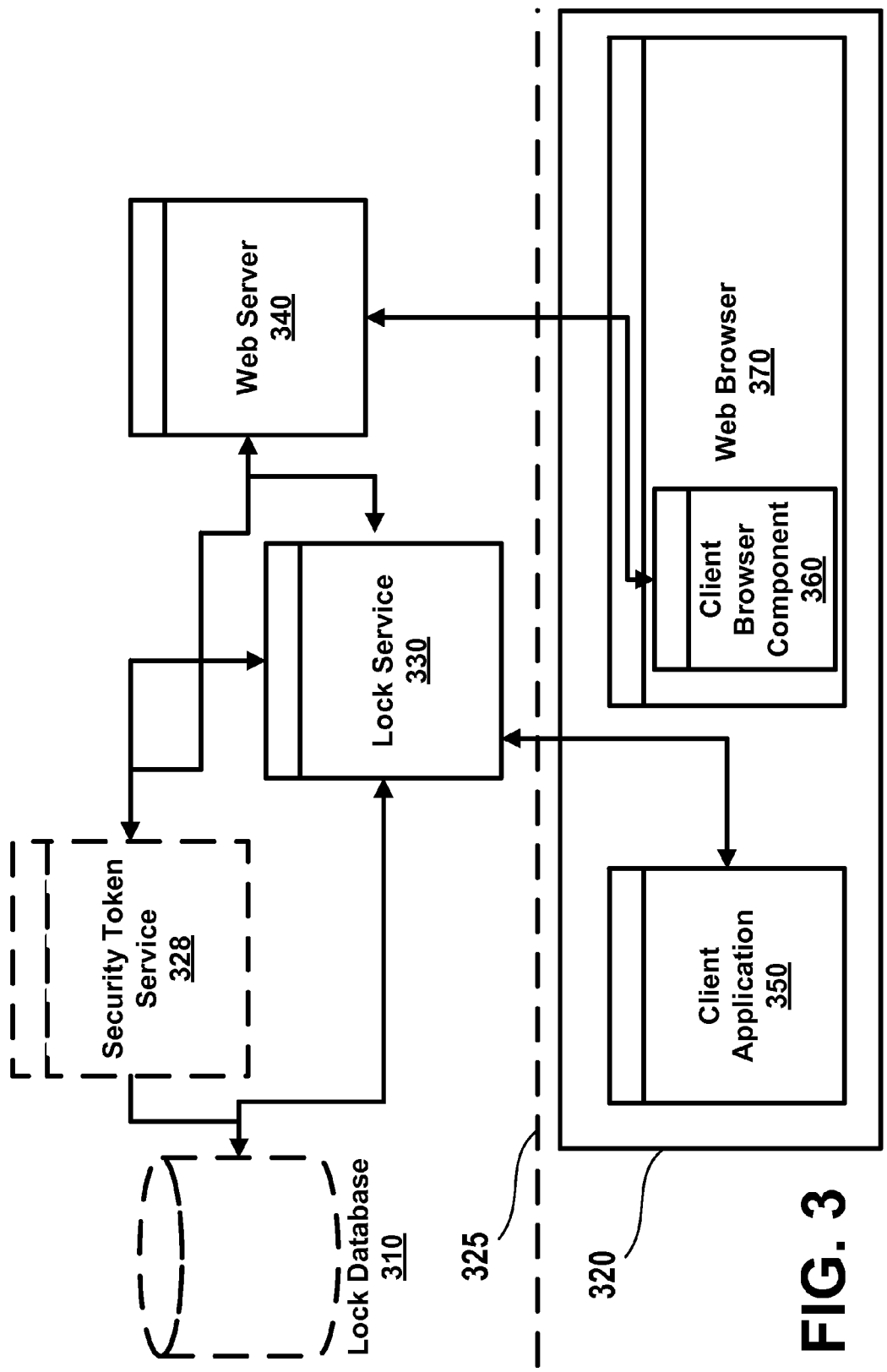
FIG. 3 is a component diagram for an embodiment of the invention.

Referring to FIG. 3, an example architecture for the use of the lock service is depicted. A native client application 350 is illustrated as running on a client device 320. Native client application 350 may be an application that calls operating system methods/Application Programming Interfaces (APIs), it may be a component of an operating system, such as a driver, hardware on client device 320, or any other component. Client application 350 may perform any function. In one embodiment, client application 350 performs operations on the operating system to fix or repair the operating system. Client device 320 may also run a web browser 370, or other internet application. The web browser 370 may run a client browser component 360. Browser component 360 may comprise a browser plug-in, script code (e.g., JavaScript) or any other component of the web browser 370.

Still referring to FIG. 3, security or other permissions may block browser component 360 from directly communicating directly with 350. Under that circumstance, a mechanism may be needed for client application 350 to synchronize and/or coordinate with the actions of client browser component 360. Client application 350 may communicate directly with lock service 330, or to the lock service 330 via a web server 340. Lock service 330 may run on the client device 320 or on a separate server device. Similarly, client browser component 360 may communicate with web server 340. Although client browser component 360 may communicate with web server 340, client browser component 360 may not be receiving web pages—rather, for example, it may be using a protocol and receiving informational messages via the protocol. In turn, in the embodiment depicted by FIG. 3, web server 340 may communicate with lock service 330.

FIG. 3 depicts a network boundary 325 between client device 320 and various server services. Server services may include web server 340, lock service 330, an optional security token service 328 and optional lock database 310. Web server 340 may be an internet server for receiving and transmitting Hypertext Transfer Protocol (HTTP), Simple Object Access Protocol (SOAP), Representational State Transfer (REST) protocol, Transfer Control Protocol/Internet Protocol (TCP/IP), File Transfer Protocol (FTP), a WebSocket protocol, or any other network protocol. In one embodiment, web server 340 is a HTTP server for serving web pages to client browsers. For example, in one embodiment, client browser 370 may be navigated to a web page to allow updates or repairs of software on client device 320.

Still referring to FIG. 3, client application 350 may communicate directly with lock service 330. Lock service 330 may allow for creation, updates, deletion and status checks of locks. Locks allow applications on a device or across devices to synchronize actions. For example, client application 350 may create a new lock via a call to lock service 330, and the status of the lock may then be acquired such that other applications wait for the lock to be released. For example, after client application 350 creates and acquires a lock, the client browser component 360 may poll for the status of the lock via web server 340 or the status of the lock may be pushed to the client browser component 360 from web server 340 or any other server. Web server 340 may acquire the status of the lock via lock service 330, and return the status to client browser component 360. Browser component 360 may wait until the lock is released.

For two or more applications to be synchronized and pass information about a lock, each application needs an identifier associated with the lock. The lock may be identified via use of a single entity in association with the lock, such as a user identifier or machine identifier. Alternately, either application may pass the identity to the other application before the lock has been created. As another alternative, the first requestor of the lock may pass the identity to the subsequent caller after the lock has been created, if the identity is specified by the lock service. The identity of the lock may be passed from a client application 350 through invocation of URI to client browser component 360, from client browser component 360 through the invocation of download and launch of data-carrying application executable to client application 350, or from yet another entity sending the identity to client browser component 360 and client application 350.

FIG. 3 also illustrates optional use of a security token service 328. Security token service 328 may determine whether a machine identifier, a user identifier, an application identifier or any other identifier or combination of identifiers has permission to create, update, delete or get and set status of a lock. Lock database 310 may optionally be used to persist the creation, deletion and status of locks. Lock database 310 may also store other state data in association with lock data, such as a lock in association with a user identifier, a machine identifier, an application identifier, or other data. As yet another example, the lock data may comprise other data useful for communication between callers, such as protocol, or other information. A lock itself may be identified via a string name, a global identifier, or any other identifier. Lock database may be implemented in a SQL database, a text file, or any other persisted file. Examples of suitable database may include GOOGLE BIGTABLE storage, ORACLE databases, MICROSOFT ACCESS or MICROSOFT SQL SERVER, as well as in-memory data storage mechanisms, though as stated previously, any storage mechanism that is used for data storage may be used.

Graphical Display of Locked State

Figure 4:
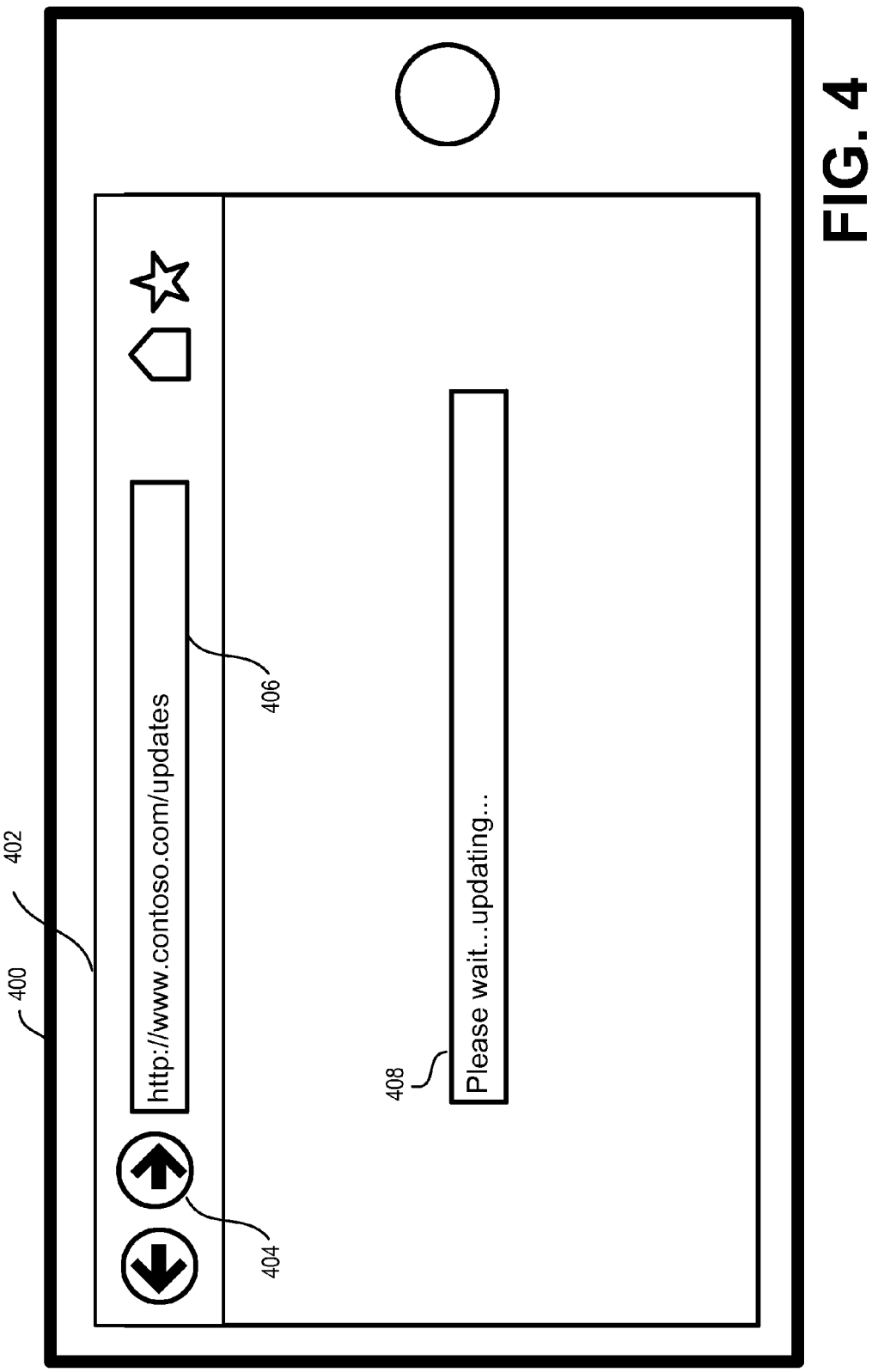
FIG. 4 is an exemplary graphical user interface for display of a lock on a web page due to the synchronization.

FIG. 4 illustrates an exemplary graphical user interface for waiting for another process or application to complete a task. The browser 400 may be any browser, such as GOOGLE CHROME, MICROSOFT INTERNET EXPLORER, FIREFOX, APPLE SAFARI or any other application used to view internet documents. Control section 402 allows navigation to Universal Resource Location (URL) 406. Controls 404 allows navigation between URLs. After a user has navigated to a web page at URL 406, the web page or part of the web page may go into a locked state. Control 408 shows part of the web page in a locked state. The browser 400 may run a browser component (e.g., JavaScript, plug-in) in the background that polls the lock service, via a web server, for when another application is finished. For example, the browser component may wait for a native application also running on the machine to complete updates or fixes, and only stop showing the locked message in control 408 when the other process has completed and released a lock. In the example of FIG. 4, the lock may be associated with a user identifier or a machine identifier, such that one application may block any number of other applications on the same machine or other machines.

Figure 5:
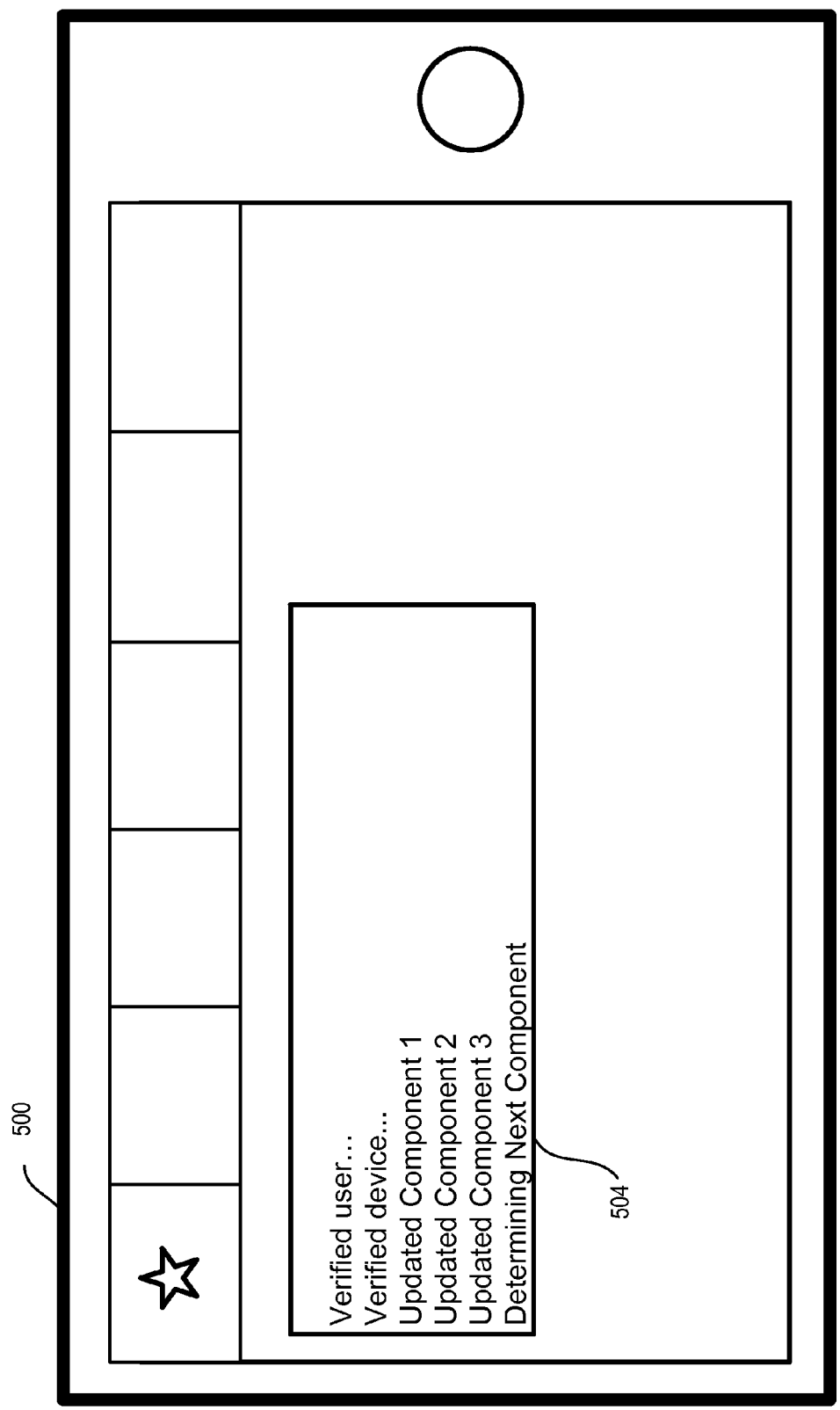
FIG. 5 is an exemplary graphical user interface for display of a lock within a native application.

FIG. 5 shows an exemplary user interface for displaying progress of a native application. Of course, an application may not have a user interface at all. In FIG. 5, display interface 500 shows update of components on a machine. Display control 504 illustrates components being verified or updated on a machine. The display control 504 may show updates or verification after a lock has been acquired, so that the application can update components and there will not be a conflict with another application or process updating the same components on the same machine. The examples of FIGS. 4 and 5 are intended to illustrate that two applications may be run concurrently, with one application waiting (e.g., depicted in FIG. 4) for another application (depicted in FIG. 5) to complete one or more tasks.

Figure 6:
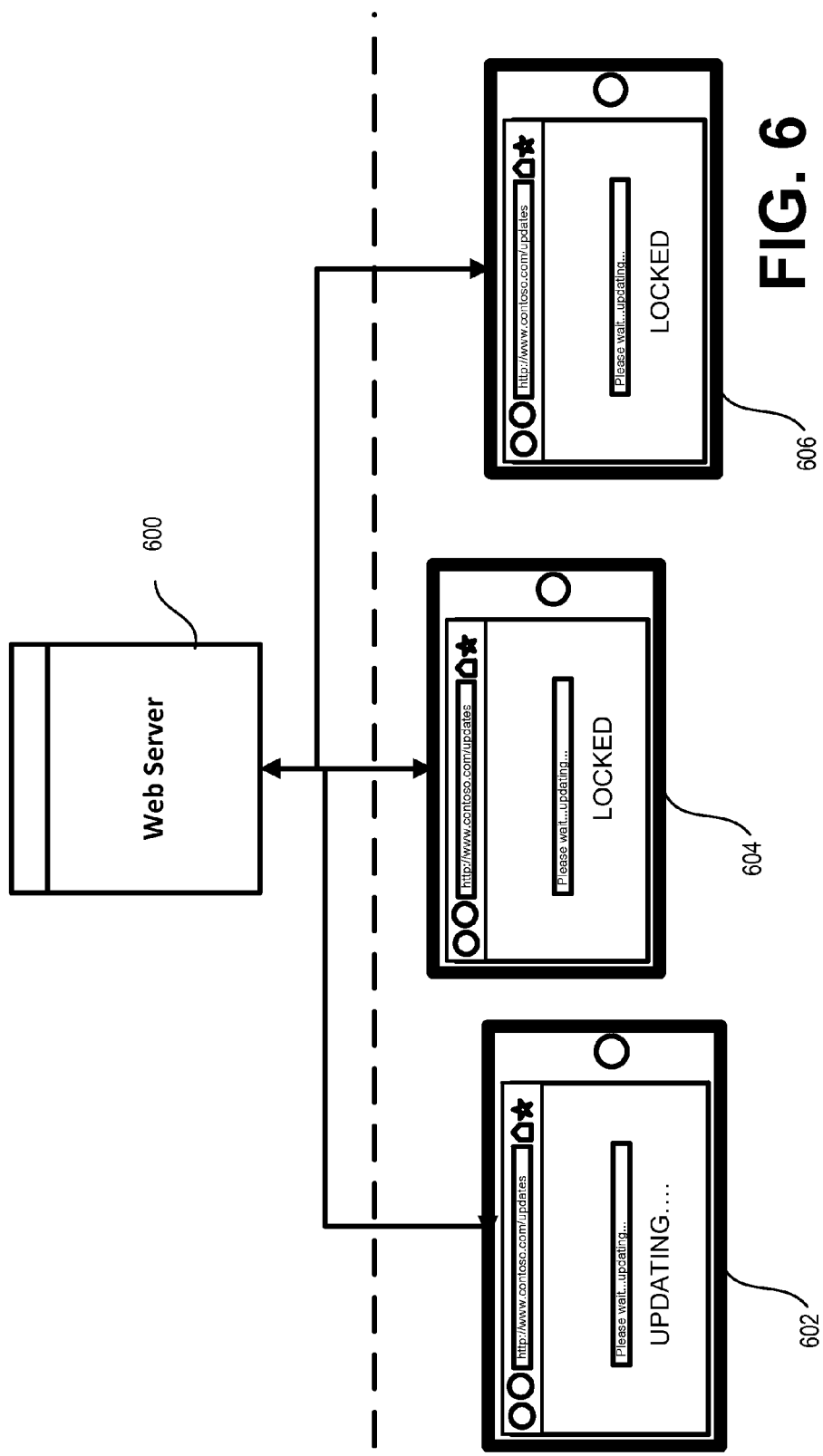
FIG. 6 illustrates devices using the synchronization mechanism.

FIG. 6 shows another embodiment of synchronization between devices that is possible. In FIG. 6, machine device 602 has acquired a lock via a lock service, or via web server 600. Because device 602 has acquired the lock, FIG. 6 illustrates device 602 proceeding with one or more tasks (depicted as updates in the example of FIG. 6). Again, once the lock is acquired, an application may proceed with any actions. Devices 604 and 606 are depicted in a locked state because they have attempted to obtain the status, or obtain the lock, subsequent to device 602. In the example of FIG. 6, the lock may be per user identifier. In other words, the lock may allow an application to proceed on any one device at a time.

A lock service may also be configured to allow a threshold number of applications to proceed on one device. The lock service may also be configured to allow a certain number of applications to proceed with one or more tasks on a certain number of machines. Still further, the lock service may allow an application to proceed based on the application type, or based on any characteristics that may be associated with an application (such as, for example, a file type being used, file or memory resources being used by the application, protocols being used, or some other characteristic). Still further, the lock service may block another application based on its type, characteristics associated with the application, and/or based on the machine it is running on or the user identifier associated with the lock.

It is to be appreciated that this lock mechanism may be used for any purpose, such as to update/repair components when only one update/repair at a time is desirable. Equally, the lock mechanism may be used for other process, such as ensuring that a user only accesses content on one device at a time. For example, content may include copyrighted material such as videos, audio files, documents, or other material that is desirable to control access. Such restriction of copyrighted material, using a lock embodiment as presented herein, may be used by an electronic library, or an electronic store, such as a web site operated by AMAZON.

Sequences of Securing Locks

Figure 7A:
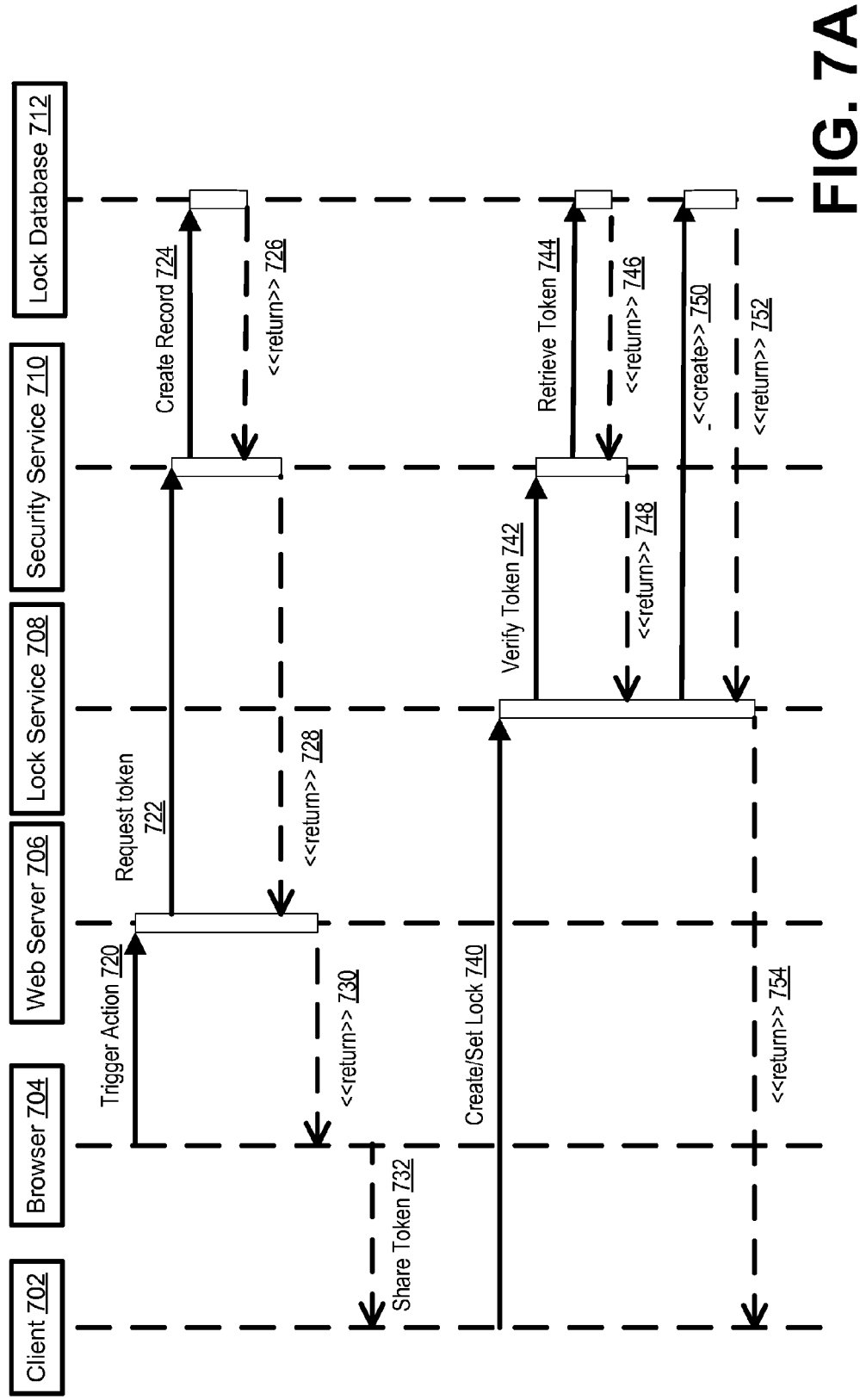
FIG. 7A illustrates sequence diagrams for creation of a lock and setting a status for the lock.
Figure 7B:
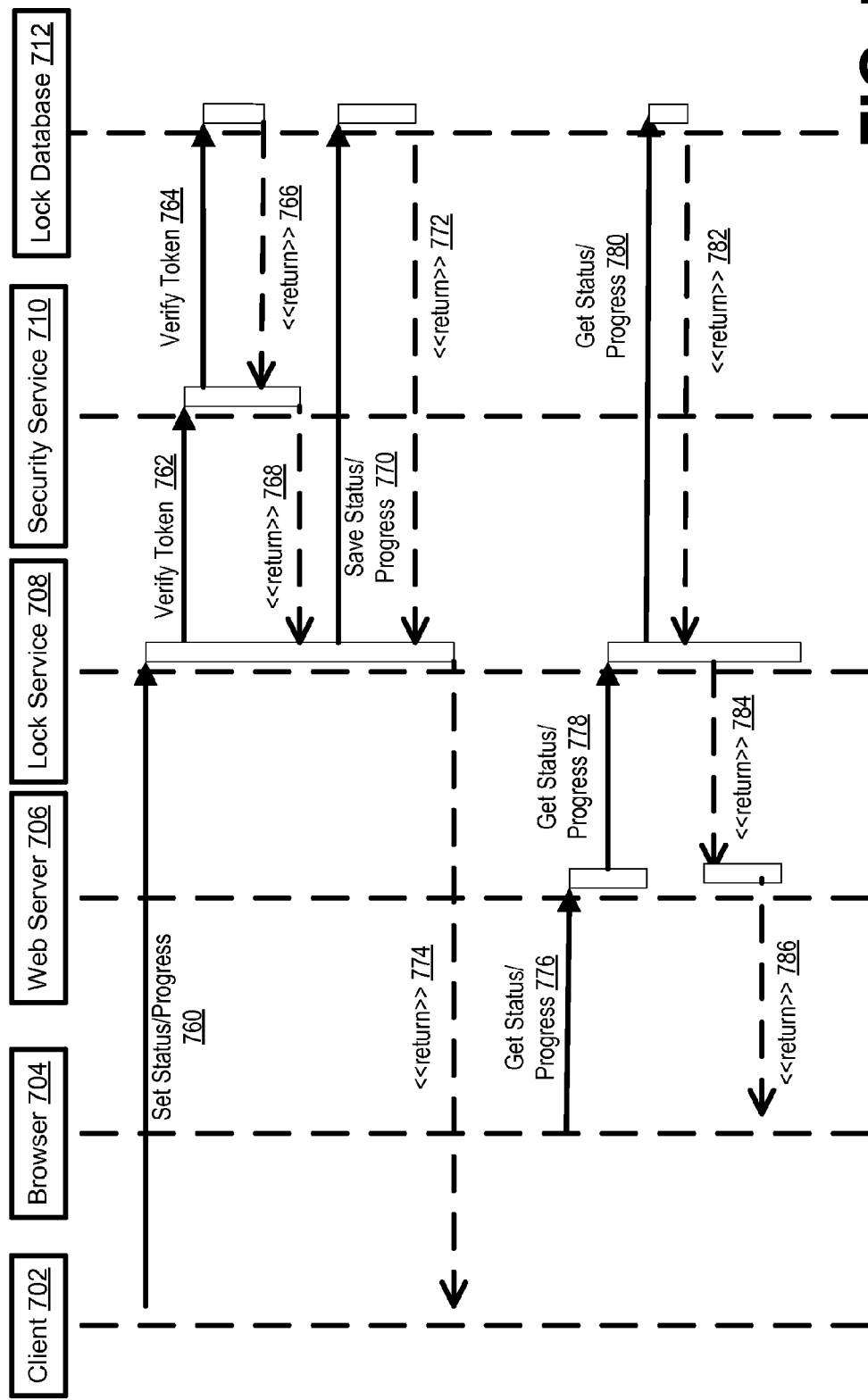
FIG. 7B illustrates sequence diagrams for determining a status of the lock.
Figure 7C:
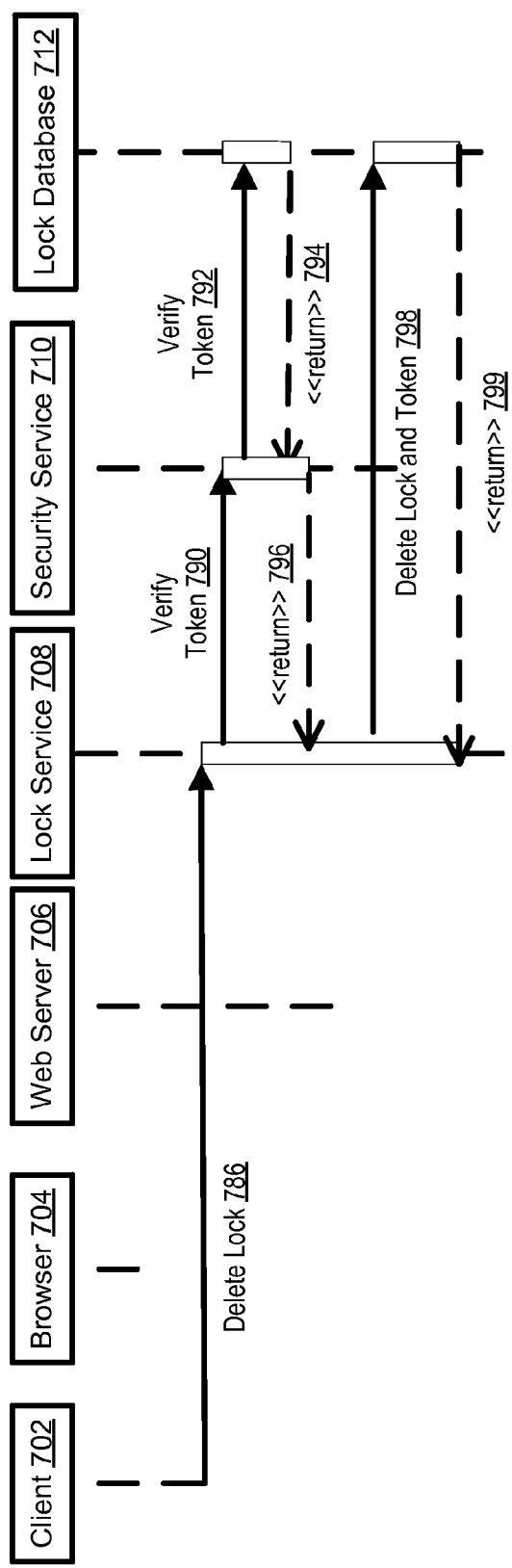
FIG. 7C illustrates a sequence diagram for destroying a lock.

FIGS. 7A-7C illustrate sequence diagrams for creation, update, deletion, as well as status calls between possible components in an embodiment of a client/server lock system. As stated previously, it is to be appreciated that the components of a lock system may all run on one machine or run on different machines.

FIG. 7A shows calls and messages for creation and obtaining status of locks. Referring to FIG. 7A, web browser 704 may send a request 720 that indicates an action is being triggered. The request may be directed towards a web server 706, to security service 710, or directly to lock service 708. The request 720 may optionally include a machine identifier, user identifier, application identifier, or any combination thereof. In the embodiment of FIG. 7A, web server 706 may then make a request to security service 710 to determine whether the identifier is valid and request a security token based on an identifier be returned. If the identifier is valid, an action may be stored in a lock database 712 via a message request 724 to store a record associated with the action. Lock database 712 may return a successful return message 726, and security service 710 may return a success message 728, and web server 706 may return a success message 730. Return messages 728 and 730 may optionally include the security token generated by security service 710.

Browser 704 may share the security token returned to it via a message 732 to client 702. As just one example, a script running in the browser may encode the token into a launch parameter before launching the client 702; it may perform this, for example, by storing the launch parameter in a shared location, or within a filename of the client application that it launches. As an alternative, the security token may be stored by the web server 706, or other server, and retrieved by the client 702 upon startup or after periodic polling. Notably, in FIGS. 7A-C, calls are shown as synchronous calls, but any message call may also be an asynchronous call.

In the example of FIG. 7A, a browser 704 is depicted as starting an action, and then client 702 creates a lock subsequently. FIGS. 7A-7C show only some possible sequence diagrams; it is to be appreciated that many other embodiments are possible. For example, request 720 may create a lock, and then launch a client 702, and client 702 may then use or set the status of the lock.

Still referring to FIG. 7A, however, client 702 is depicted as creating the lock such that other applications or devices can be synchronized with the lock. In the example of FIG. 7A, client 702 creates the lock by sending message 740 to lock service 708. The message 740 may include an application, user, machine or other identifier with it. While an application user or machine identifier may be included, it is noteworthy that this does not imply the lock is only associated with the application, user or machine. The lock may be associated with a resource, such as access to Application Programming Interfaces, or other processing or computational resources. Still further, it may be preferable to pass other data along with the identifier, such as state data to be used in association with the lock or resource being locked.

Optionally, lock service 708 may use the identifier to send a token to security service 710 in a message 742. Security service 710 may forward a request 744 to lock database 712 to validate the token. Lock database may return message 746 and security service may return the success or failure in message 748 to lock service 708. If the token appears valid, then lock service 708 may create the lock in association with the application, user, machine or other identifier by sending message 750 to the lock database 712. Lock database 712 may store an identifier of the lock in association with the application, user, machine or other identifier and then return message 752 indicating successful creation of the lock. Lock service 708 may then return message 754 to client 702 indicating the lock has been created. Message 754 may include an identifier associated with the lock so that client 702 may determine status and perform other operations related to the lock by referral to the lock identifier.

Turning to FIG. 7B, after the client 702 has established a lock, it may update progress on the client action, set status of the lock, or otherwise add, update or remove data associated with the lock. Client 702 may send message 760 to lock service 708 in order to update progress. As before, lock service 708 may verify a security token via sending a request 762 to security service 710 to verify one or more identifiers within a security token. Security service 710 may verify the token by calling lock database 712 via message 764. Lock database 712 may return message 768 to security service 710, and in turn, security service 710 may return a message 768 to lock service 708.

Assuming the validation of the token was successful, lock service 708 may save the progress of client 702 by sending a progress and/or status indicator received from client 702 to the lock database 712 in message 770. The progress and/or status would be saved by lock database 712 in association with the identifier for the lock. After saving status and/or progress, lock database 712 may return information via message 772 to lock service 708, and lock service 708 may return a success or failure code to client 702 via messages 772 and 774 respectively.

Still referring to FIG. 7B, the other application on the device, or on another device, such as browser 704, may inquire as to the status and/or progress of the other client 702. Browser 704 may send message 776, to get the status of the lock, to web server 706. Web server 706 may request the status from lock service 708 via message 778. Lock service 708 may retrieve the status from lock database 712, and the status and/or progress may be returned via return messages 782, 784 and 786 back to the browser 704. Although FIG. 7B illustrates browser 704 retrieving a lock status via message 776, another method of updating status may be for a server, such as web server 706 to send the status of the lock to the browser 704 by use of a push mechanism, such as via a WebSocket protocol. A technical advantage of pushing the status from the server may be that the browser does not need to spend processor cycles polling for status that may not have changed.

Turning to FIG. 7C, after client 702 has finished its tasks (such as, for example, finishing repairs and/or updates to an operating system), client 702 may delete the lock. Client 702 may call the lock service 708 with a delete lock 786 message request. As an optional alternative, client 702 may send the message to web server 706, which in turn may send a message to the lock service 708. Optionally, lock service 708 may verify a token comprising an identifier with security service 710 via a request 790. Security service 710 may request the lock database to validate the token via message 792, and verification returned via messages 794 and 796. Once verified, lock service 708 may send a request to actually delete the lock in message 798. After the lock database 712 has deleted the lock, it may return a message 799 indicating a successful deletion. In lock database 712, the lock records, optionally in association with an application, user, machine, or other identifier may be deleted.

Computer-Implemented Processes of Synchronization

Figure 8:
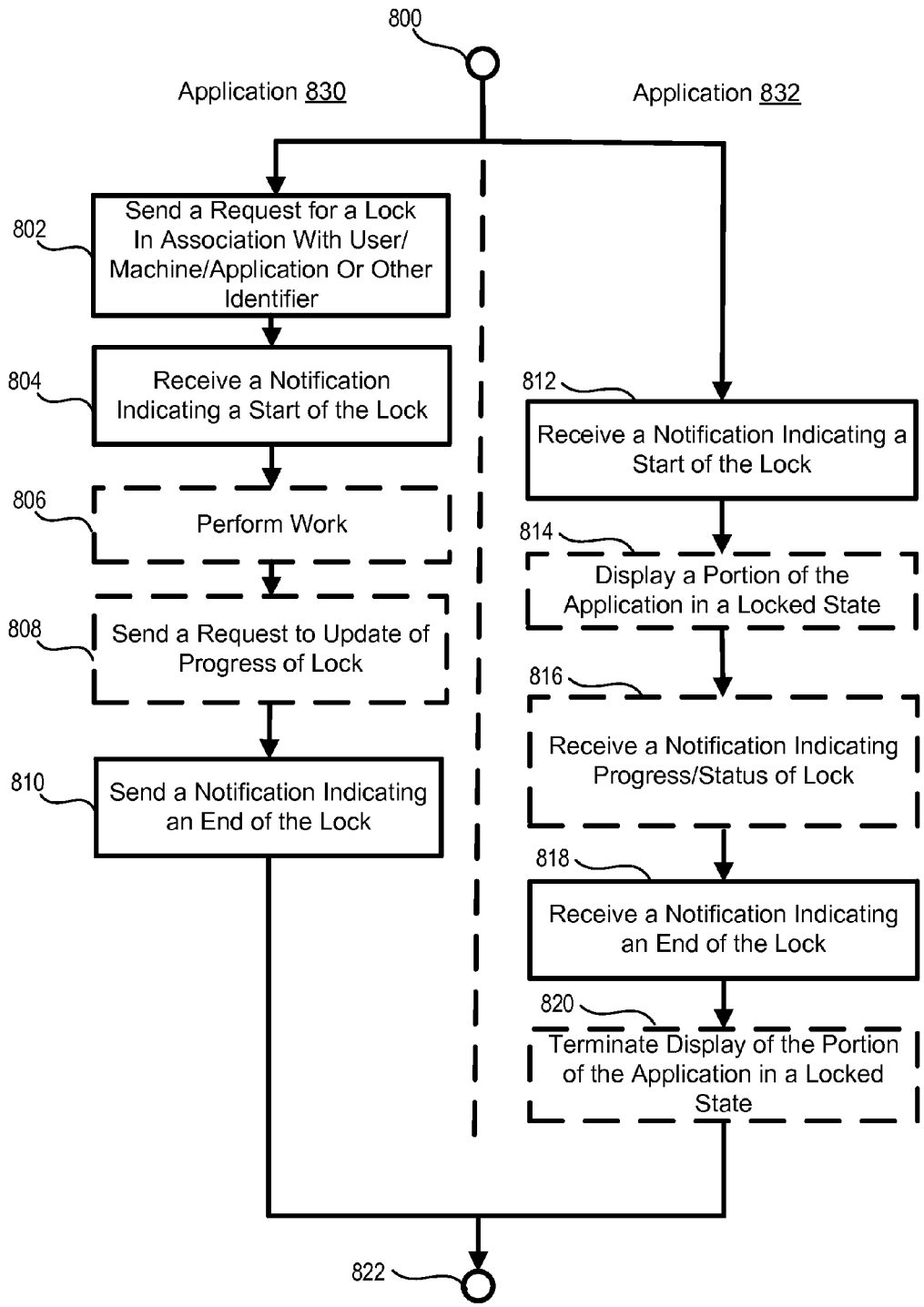
FIG. 8 illustrates a computer related method for sending and receiving lock and other notification messages.

FIG. 8 illustrates activity of two applications in conjunction with a lock. FIG. 8 depicts actions of a first application 830 that may be an application that takes out a lock, and blocks other applications from access to a resource, and second application 832 that is waiting for application 830 to release a lock. At starting stage 800, an application may be ready to initiate actions. The application 830 may determine an identifier associated with the machine it is running on, the application running, a current or other user identifier, or other identifier. At step 802, the identifier may be sent to a lock service or web server to request a lock be created. By requesting the lock, the application 830 is signaling that other applications being run on the same or other devices may not proceed with one or more types of actions while the lock is set. FIG. 8 depicts activity of application 830 that creates a lock and concurrent activity by application 832 that responds to notifications based on the lock. As described previously, applications 830 and 832 may be on the same machine, or on different devices. Applications 830 and 832 may be run under the same user identity, or different user identities.

Still referring to FIG. 8, and considering the activity of application 830, at step 804, the client application receives notification that it has obtained a lock. Optionally, at step 806, the application 830 may perform work. Typically, the work performed in step 806 may involve operations that would lead to problems if performed by two parallel processes without synchronization. As just one example, updates to an operating system on a device may be done by one process. At step 808, after some work has been performed, the application 830 may send a request to update progress of the task, and associate a progress with the lock. The request may update the progress itself, or the status of the lock. In the case of the application that is progressing with tasks, this allows other applications to get the status. In the case of the other applications that are waiting for the lock to be released, it may allow the other applications to display a progress bar or other notification mechanism on when the process will be finished. At step 810, application 830 may send a notification to terminate the lock, and processing of the method for application 830 may stop at 822.

Still referring to FIG. 8, the actions performed by another application 832 operating concurrently with application 830 may be described. At step 812, the notification of the progress or status of the lock may be received, indicating that a lock was started by application 830. At step 814, the application 832 may display part of the application in a locked state. This may be, for example, via an icon, glyph, status bar, or other display mechanism. Equally, it may via an entire web page or via a progress indicator. The user interface may prevent a user from progressing with a subset of actions or an entire set of actions. At step 816, application 832 may receive notification of the progress of the lock or work performed by the other application 830. Application 832 may display the progress as a progress bar, percent complete or other suitable progress indicator. At step 818, the application 832 may receive a notification that the lock has ended. At step 820, application 832 may terminate display of the locked portion of user interface. Processing of the method for application 832 may optionally terminate at step 822.

In the example of FIG. 8, updates on the status of a lock, or progress of a task may be performed by receiving information from a server. For example, in the example of FIG. 8, application 832 may poll the server at intervals to retrieve status. Another method that may be used, however, is that application 832 may actively receive status messages about the lock or progress of the work via a bi-directional protocol. For example, by using the WebSocket protocol or any other bi-directional communication protocol, application 832 may be able to receive messages without having to poll for data at incremental intervals.

FIG. 8 illustrates an example of a process to be implemented by a computer using computer-readable instructions. From the perspective of a client application, the computer-implemented method involves sending and receiving messages so that a task may be completed or blocked while another application completes a task. For example, the client application on a first computer may send a request for a status of a lock to a first server, the request including a first identifier of a first user. The client application may then spawn another application on the client machine, or the other application may start by other means (e.g., a timer starts the application, the application is started by a server, etc.) The client application may then wish to be in a locked state receiving, from the first server, a first message indicating a start of the lock, wherein the lock is associated with the first user.

After an application has received a notification of a lock, it may suspend further processing, at least of one or more tasks. The application may display at least a part of a user interface in a locked state. For example, the application may display a progress bar showing the progress of the other application. The application may also display an icon or glyph indicating that another application is processing.

The first application and second application that are each using the lock may be any one of a script run by a browser, a browser plug-in, a browser, a native application, an operating system component, a device driver, any other software component, a managed component, or a hardware component. A managed component may include, without limitation, a Common Language Runtime program, a Perl script, a PHP script, POWERSHELL, SILVERLIGHT, JAVA, JavaScript, ANDROID or WINDOWS applications. An application may be any process (e.g., an executable) or it may be a library (e.g., a dynamic link library or a static library). Each application may perform the same or different tasks. For example, a first application may be a web application for managing repair of components on a computer and the second application may be an application for modifying settings of one or more components on the first computer. In the example just described, it may be desirable for the first application to initiate repair of the device, wait for the second application to complete repairs, and then release the user interface for further tasks only after the second application is completed.

After a second application has completed a task, and released a lock, the first application may receive a message indicating the ending of the lock. The first application that was waiting for the lock to be released may display an indication that the task is completed in the user interface.

A feature of the locking mechanism is that it may be used across machines. A first machine may wait for a lock while a task may be completed on a second machine, the second machine different than the first machine. To facilitate cross-machine locking, a request may comprise an identifier of an application, an identifier of a machine, an identifier of the user using a machine, or other identifier. In that way, the information related to the lock may be obtained by just sending the identifier. For example, if a user is logged in to 3 devices, the user may request status of a single lock that is associated with the single user identifier. This feature may be especially advantageous when a user owns multiple devices, and one machine at a time needs an update, modification or deletion. For example, if a user has a mobile phone (e.g., a GOOGLE ANDROID phone or APPLE phone, or any other phone), a tablet device (e.g., ANDROID tablet, or MICROSOFT WINDOWS SURFACE tablet, or any other tablet) and a personal computer (e.g., a computer running RED HAT LINUX, or a personal computer running any other operating system), then the user may only get access to reading a book or viewing a movie on one device at a time. Under that circumstance, a user identifier may be automatically uploaded such that a lock to the resource (the electronic item) is created—the other devices are locked while a user views the electronic item on a device.

Figure 9:
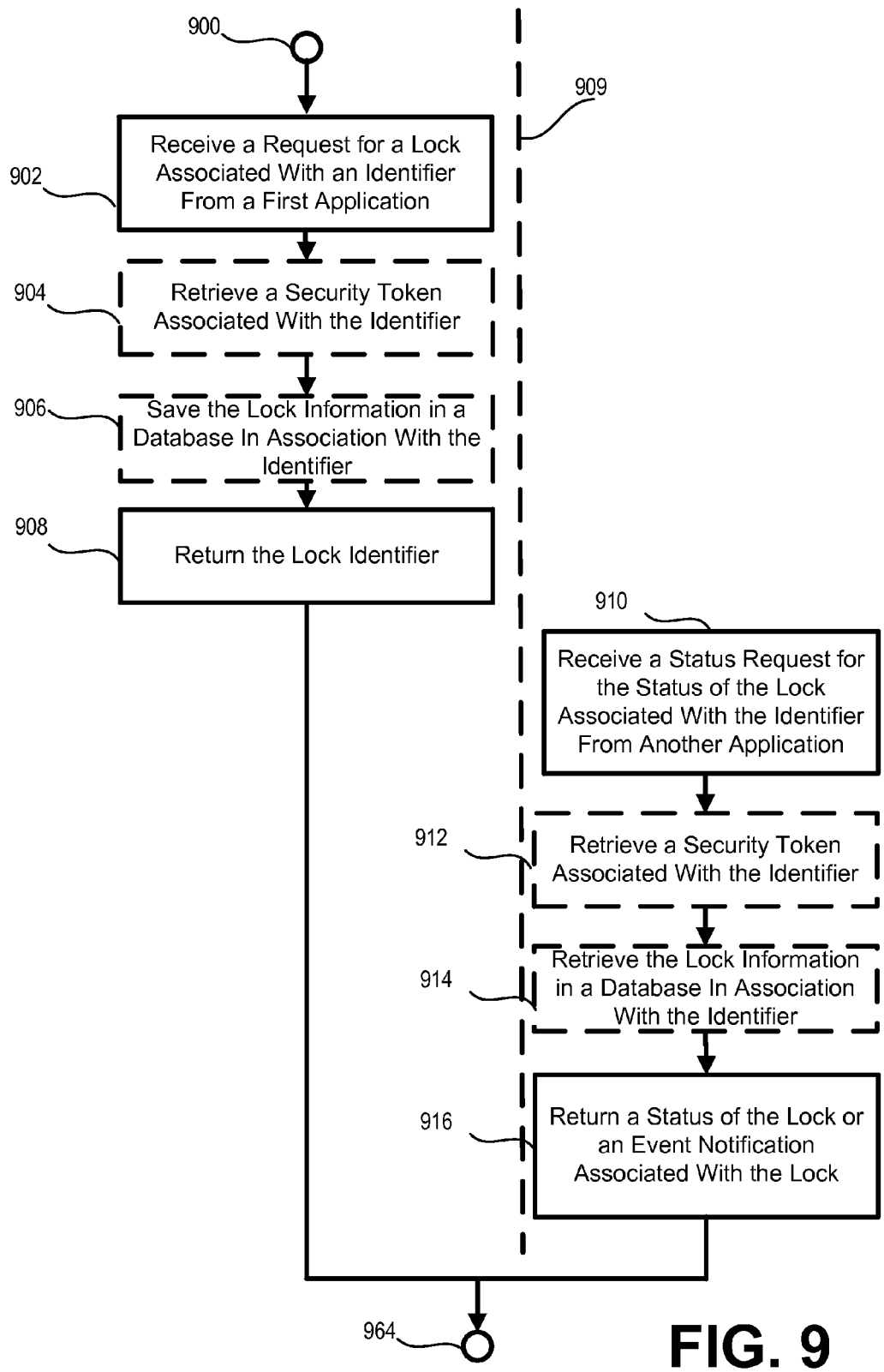
FIG. 9 illustrates a computer related method for receiving and processing requests related to a lock on a server.

FIG. 9 illustrates a computer related method for receiving and processing requests related to a lock on a server. The computer-related method illustrated by FIG. 9 may be carried out by a dedicated lock service, by an intermediary server, such as a web server, or any other device. At stage 900, a request for a lock has not yet been received. At step 902, the server receives a request for a lock in association with an identifier. As described previously, the identifier may be a machine, user, application or other identifier. At step 904, the server may optionally retrieve a security token associated with the identifier. As an example, if the identifier is a user identifier, the server may obtain a security token from a security service, such as directory services. At step 906, the server may save the identifier in association with the lock in a database. At step 908, the server may return a lock identifier that is saved in the database back to the calling client application.

Still referring to FIG. 9, an application boundary 909 is illustrated to show that the server may receive requests from different applications. At step 910, the server may receive a status request for the lock from another application. The request received at step 910 may include the user, application, machine or other identifier within the request. At optional step 912, a security token associated with the identifier received in 910 may be obtained, and at step 914, the lock information may be obtained by using the lock identifier in conjunction with the security token and/or the user/machine/application identifier received in the request. At step 916, the status or progress information associated with the lock is retrieved from the database and returned to the requesting client application. Processing of requests by different clients by the server may continue until the lock has been destroyed, and processing finishes at 964.

FIG. 9 illustrates a computer-related method for implementing a lock service. A server computer system, comprising a processor for executing computer instructions, may perform the computer-related method. The lock service running on a server may run on a standalone server, or the lock service may be provided as part of or alongside a web server. The lock service may be integrated with or separated from a security service, and the lock service may be integrated with data storage for the lock information, such as a database, file, or other storage mechanism.

The lock service may receive a first request to start a lock from a first application on a first machine, the request including a user identifier. The lock service may then send and receive messages with other services, such as a security service and a database to create a lock in association with the user identifier. Alternately, the lock service may just maintain an internal data structure to hold lock information, and create the lock. The lock service may send a first message indicating a start of the lock in association with the user identifier back to the first machine.

Subsequent to creation of the lock, the lock service may receive a second request for a status of the lock from a second application on a second machine, the second request also including the user identifier. The lock service may look up the lock in association with the user identifier, and send a second message indicating the status of the lock associated with the user identifier back to the second application. The second message further comprises an indication of the progress of an application on the first machine.

Requests for a lock to be created may involve sending a security message to a security service, the security message including the user identifier, receiving a security token from the security service in return; and sending a database message to a lock database, the database message including the security token.

The requests and messages may be made via any protocol, such as, without limitation Hypertext Transfer Protocol (HTTP), Simple Object Access Protocol (SOAP), Representational State Transfer (REST) protocol, Transfer Control Protocol/Internet Protocol (TCP/IP), WebSocket protocol, or a web service call.

Various operations of embodiments of the present invention are described herein. In one embodiment, one or more of the operations described may constitute computer readable instructions stored on computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method comprising:
   at a first client computer, running a native client application and a web application, wherein the native client application runs on an operating system of the first client computer and the web application runs in a browser of the first client computer and communicates with a web server over a network;
   sending, by the native client application, a request for a lock to a lock service;
   receiving, by the web application from the lock service, a first notification message indicating a start of the lock;
   displaying, at the first client computer, at least a portion of the web application in a locked state, wherein the portion of the web application in the locked state is blocked from accessing the web server;
   performing, by the native client application, one or more operations to update the native client application;
   sending, by the native client application, a request to terminate the lock to the lock service after completion of the one or more operations;
   receiving, by the web application from the lock service, a second notification message indicating an end of the lock; and
   terminating, at the first client computer, the display of the portion of the web application in the locked state.

2. The computer-implemented method of claim 1, further comprising:
   synchronizing the native client application and the web application after the end of the lock.

3. The computer-implemented method of claim 1, wherein the native client application manages repair of one or more components on the first client computer, and the web application modifies settings of the one or more components on the first client computer.

4. The computer-implemented method of claim 1, wherein the request for the lock includes:
   a user identifier indicating an identity of a user; and
   a machine identifier indicating an identity of the first client computer sending the request for the lock.

5. The computer-implemented method of claim 4, further comprising:
   at a second client computer, sending a request from a second web application to the web server, the request including the user identifier;
   receiving, at the second client computer, a notification that the second web application is locked; and
   displaying at least a portion of the second web application in a locked state on the second client computer.

6. The computer-implemented method of claim 1, wherein the request for the lock to the lock service is made by a protocol that is any one of: Hypertext Transfer Protocol (HTTP), Simple Object Access Protocol (SOAP), Representational State Transfer (REST) protocol, Transfer Control Protocol/Internet Protocol (TCP/IP), a WebSocket protocol, or a web service protocol.

7. A server computer system, comprising:
   a processor for executing computer instructions; and
   memory storing computer-executable instructions that, when executed by the processor, cause the server computer system to perform a method for a locking service comprising:
      receiving a first request to start a lock from a native client application running on an operating system of a first client computer, the first request including a user identifier;
      sending, to a first web application running on the first client computer, a first message indicating a start of the lock in association with the user identifier, wherein the first web application is configured to suspend processing of one or more tasks upon receipt of the first message and wait for release of the lock;
      receiving a second request for a status of the lock from a web server that communicates with a second web application running on a second client computer, the second request including the user identifier; and
      sending, to the web server, a second message indicating the status of the lock associated with the user identifier, wherein the web server is configured to notify the second web application of the status of the lock, and wherein the second web application is configured to wait until release of the lock before progressing with one or more actions.

8. The server computing system of claim 7, wherein the second message further indicates progress of updating the native client application on the first client computer.

9. The server computing system of claim 7, wherein the first request to start a lock further includes a machine identifier indicating an identity of the first client computer.

10. The server computing system of claim 7, the method further comprising:
    sending a security message to a security service, the security message including the user identifier;
    receiving a security token from the security service; and
    sending a database message to a lock database, the database message including the security token.

11. The server computing system of claim 7, wherein the first request and the second request are made via a protocol that is any one of: Hypertext Transfer Protocol (HTTP), Simple Object Access Protocol (SOAP), Representational State Transfer (REST) protocol, Transfer Control Protocol/Internet Protocol (TCP/IP), a WebSocket protocol, or a web service protocol.

12. The server computing system of claim 7, wherein the native client application manages repair of one or more components on the first client computer, and the first web application modifies settings of the one or more components on the first client computer.

13. A computer-readable storage device having memory that stores computer executable instructions which, when executed by a computer, cause the computer to perform a method, the method comprising:

sending, from a web application running in a browser on the computer, a request for a status of a lock to a lock service, the request including an identifier of a user;

receiving, from the lock service at the web application, a first message indicating a start of the lock, wherein the lock is associated with a native client application being run by the user;

displaying at least a part of a user interface of the web application in a locked state to prevent the web application from performing one or more actions;

receiving, from the lock service at the web application, a second message indicating progress of a task performed by the native client application being run by the user;

displaying the progress of the task in the part of the user interface of the web application in the locked state;

receiving, from the lock service at the web application, a third message indicating an end of the lock;

displaying an indication that the task is completed in the part of the user interface of the web application in the locked state; and terminating display of the part of the user interface of the web application in the locked state.

14. The computer-readable storage device of claim 13, wherein the native client application manages repair of one or more components on the computer.

15. The computer-readable storage device of claim 14, wherein the web application modifies settings of the one or more components on the computer.

16. The computer-readable storage device of claim 13, wherein the task is completed on a machine separate from the computer.

17. The computer-readable storage device of claim 13, wherein the request further includes an identifier of the web application.

18. The computer-readable storage device of claim 13, wherein the request further includes an identifier of the computer.

19. The computer-readable storage device of claim 13, wherein the request is made via a protocol that is any one of: Hypertext Transfer Protocol (HTTP), Simple Object Access Protocol (SOAP), Representational State Transfer (REST) protocol, Transfer Control Protocol/Internet Protocol (TCP/IP), a WebSocket protocol, or a web service protocol.

20. The computer-readable storage device of claim 13, wherein the method further comprises:

synchronizing the native client application and the web application after the task is completed.

* * * * *